US012576876B2

US 12,576,876 B2

(12) United States Patent
Cai et al.

(10) Patent No.: US 12,576,876 B2
(45) Date of Patent: Mar. 17, 2026

(54) METHOD FOR IMPLEMENTING AUTONOMOUS DRIVING, MEDIUM, VEHICLE-MOUNTED COMPUTER, AND CONTROL SYSTEM

(71) Applicant: Robert Bosch GmbH, Stuttgart (DE)

(72) Inventors: Jing Cai, Suzhou (CN); Luoyi Huang, Suzhou (CN)

(73) Assignee: Robert Bosch GmbH, Stuttgart (DE)

( * ) Notice: Subject to any disclaimer, the term of this patent is extended or adjusted under 35 U.S.C. 154(b) by 207 days.

(21) Appl. No.: 18/041,961

(22) PCT Filed: Aug. 26, 2021

(86) PCT No.: PCT/EP2021/073587
§ 371 (c)(1),
(2) Date: Feb. 16, 2023

(87) PCT Pub. No.: WO2022/043423
PCT Pub. Date: Mar. 3, 2022

(65) Prior Publication Data
US 2023/0331248 A1 Oct. 19, 2023

(30) Foreign Application Priority Data

Aug. 31, 2020 (CN) .......................... 202010895002.7

(51) Int. Cl.
*B60W 60/00* (2020.01)
*G06V 20/10* (2022.01)
*G06V 20/52* (2022.01)

(52) U.S. Cl.
CPC ......... *B60W 60/001* (2020.02); *G06V 20/182* (2022.01); *G06V 20/52* (2022.01);
(Continued)

(58) Field of Classification Search
None
See application file for complete search history.

(56) References Cited

U.S. PATENT DOCUMENTS

2015/0353094 A1* 12/2015 Harda ............. B60W 30/18163
701/23
2018/0231977 A1* 8/2018 Uno ...................... B60W 10/20
(Continued)

FOREIGN PATENT DOCUMENTS

CN 105303861 A 2/2016
CN 108454631 A 8/2018
(Continued)

OTHER PUBLICATIONS

International Search Report corresponding to PCT Application No. PCT/EP2021/073587, mailed Dec. 3, 2021 (English language document) (4 pages).

*Primary Examiner* — James M Mcpherson
*Assistant Examiner* — Bakari Underwood
(74) *Attorney, Agent, or Firm* — Maginot, Moore & Beck LLP

(57) ABSTRACT

A method for implementing autonomous driving and a vehicle-mounted control system includes: obtaining a first signal from at least one first sensor fixedly arranged at a specific location, where the first signal indicates static travelling information related to a lane; obtaining, from a vehicle-mounted sensor, a second signal indicating dynamic travelling information related to a vehicle travelling road; and establishing a travelling route corridor on the basis of at least one of the first signal and the second signal.

12 Claims, 5 Drawing Sheets

(52) U.S. Cl.
 CPC . *B60W 2420/403* (2013.01); *B60W 2420/408*
  (2024.01); *B60W 2552/53* (2020.02); *B60W*
  *2556/35* (2020.02); *B60W 2556/50* (2020.02)

(56)                References Cited

U.S. PATENT DOCUMENTS

2018/0237006 A1\*  8/2018  Ishii ..................... B60W 30/08
2020/0200896 A1   6/2020  Shan

FOREIGN PATENT DOCUMENTS

EP        2 955 077  A1   12/2015
EP        3 366 539  A2    8/2018
WO       2019/179417  A1    9/2019

\* cited by examiner

METHOD FOR IMPLEMENTING AUTONOMOUS DRIVING, MEDIUM, VEHICLE-MOUNTED COMPUTER, AND CONTROL SYSTEM

This application is a 35 U.S.C. § 371 National Stage Application of PCT/EP2021/073587, filed on Aug. 26, 2021, which claims the benefit of priority to Serial No. CN 202010895002.7, filed on Aug. 31, 2020 in China, the disclosures of which are incorporated herein by reference in their entirety.

The present disclosure relates to autonomous driving, and in particular, to determining a travelling corridor during travelling of a vehicle.

BACKGROUND

With the development of communications technologies and artificial intelligence, autonomous driving has gradually come true. Autonomous driving requires that a system can completely take over the control of the entire vehicle, and a driver does not need to be fully responsible for the control of the entire vehicle. This requires the system to be able to not only handle driving cycles in normal and ideal states, but also handle driving cycles in some anomalous situations. The anomalous driving cycles herein include obstacles or accidents on a travelling road. In many cases, these anomalous driving cycles require the system to define a travelable corridor in advance according to possibly predicted driving cycles, so as to avoid danger caused by the anomalous situations. Therefore, in order to predict these normal and anomalous driving cycles, a variety of sensors, such as an image sensor, a laser radar, or a millimeter wave radar, are usually mounted on the vehicle. The image sensor is used to obtain, in real time, visual information of a lane (such as lane lines or lane edges) and an environment on a travelling road, and the radar may be used to scan the travelling road and a surrounding environment, so as to obtain environment information such as obstacles and median strips. A vehicle-mounted computer can establish a travelling corridor on the basis of the information from these sensors, thereby planning a safe travelling route for the vehicle, so that the vehicle can travel along the corridor during autonomous driving. The detection and establishment of the travelable corridor is mainly that an accessible area that can be freely detected by the sensor is fused with an expected travelling trajectory of a vehicle or an obstacle in front of or in front left/right of the vehicle as predicted, to infer a travelable area of the current vehicle, that is, the corridor, such that the vehicle travels along the corridor to implement vehicle-following control or lane-following control. For example, during lane-following control, if it is detected that lane lines on both sides of the current lane are clear, control based on lane lines is preferred, and a specific vehicle-following distance is kept from a vehicle ahead. However, during vehicle-following control, a predicted travelling state of a vehicle ahead which is identified by a vehicle-mounted sensor is used as a reference for an expected driving trajectory of the host vehicle, a corresponding driving trajectory line is predicted within the travelable corridor of the host vehicle, and control of the driving trajectory of the host vehicle is implemented according to the trajectory line. FIG. 1 shows an example of such a travelling corridor. As shown in the figure, a travelling corridor L is established by using an image sensor or in combination with radar scanning, where a vehicle is restricted to travel safely in a lane defined by the line AA, and autonomous driving is implemented depending on whether the presence of vehicles ahead and speed limits are detected.

However, it can be seen that at a turning of the lane, for example, as shown by W in the figure, there is a blind spot for the image sensor of the vehicle. The image sensor may not obtain lane information at the turning, and the radar may not be able to accurately scan environment information at the turning due to obstacles either. Therefore, the vehicle cannot establish an effective and safe travelling corridor. In addition, in a dim environment such as a tunnel or a bridge opening, sharp changes in light inside and outside the tunnel may cause the image sensor to fail to accurately read the lane information, and the dark light may also cause recognition difficulties after the vehicle enters the tunnel.

SUMMARY

The present disclosure provides an improved method for implementing autonomous driving, in which one or more sensors are arranged at a specific location such as a lane turning or a tunnel, to provide lane and/or lane environment information for an upcoming vehicle, thereby assisting the vehicle in establishing a safe travelling corridor.

According to one aspect of the present disclosure, there is provided a method for implementing autonomous driving, including: obtaining a first signal from at least one first sensor fixedly arranged at a specific location, where the first signal indicates static travelling information related to a lane; obtaining, from a vehicle-mounted sensor, a second signal indicating dynamic travelling information related to a vehicle travelling road; and establishing a travelling route corridor on the basis of at least one of the first signal and the second signal.

According to another aspect of the present disclosure, there is provided a vehicle-mounted control system, including: a receiver configured to obtain a first signal from at least one first sensor fixedly arranged at a specific location, where the first signal indicates static travelling information related to a current lane; at least one vehicle-mounted sensor configured to detect dynamic travelling information of a vehicle and output a second signal indicating dynamic travelling information; and a vehicle-mounted computer that establishes a travelling route corridor on the basis of at least one of the first signal and the second signal.

In addition, according to other aspects of the present disclosure, there are further provided a vehicle-mounted computer and a machine-readable storage medium, where the vehicle-mounted computer can implement the method of the present disclosure by executing instructions on the storage medium.

DETAILED DESCRIPTION

Figure 1:
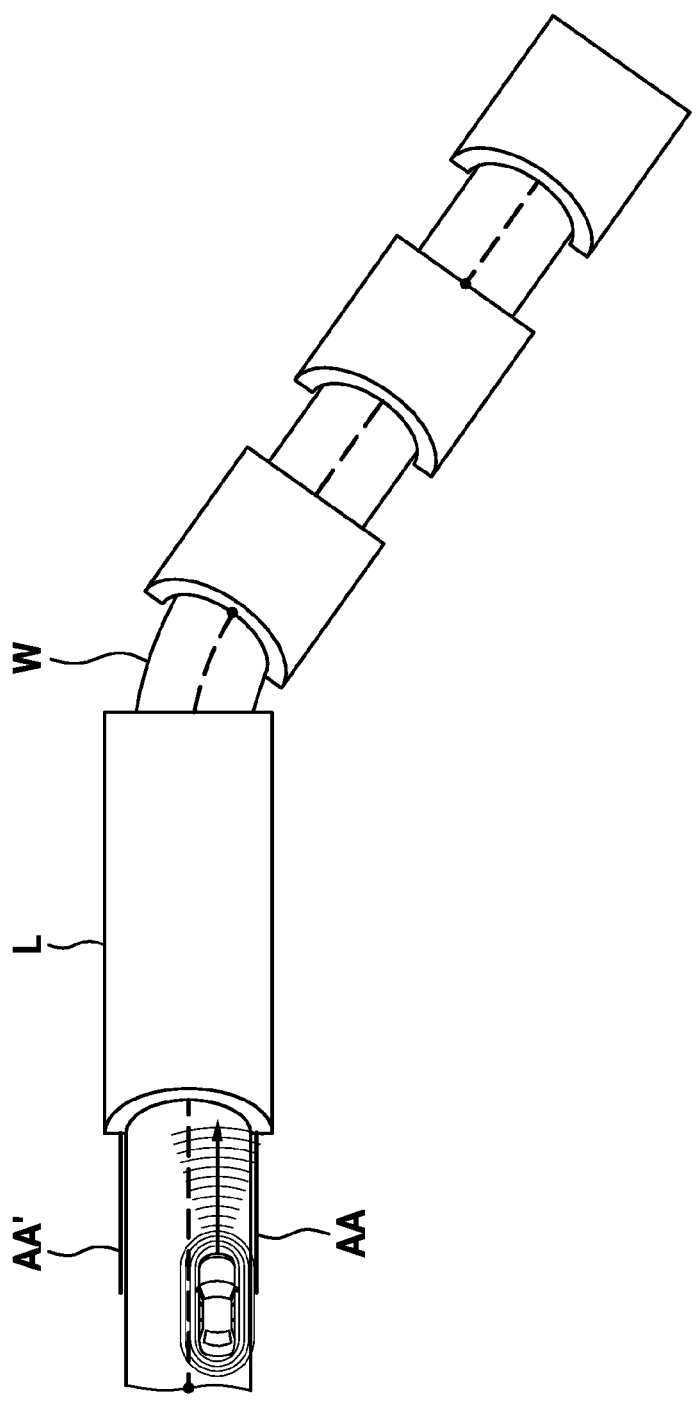
FIG. 1 schematically shows a schematic diagram of conventionally establishing a travelling corridor.
Figure 2:
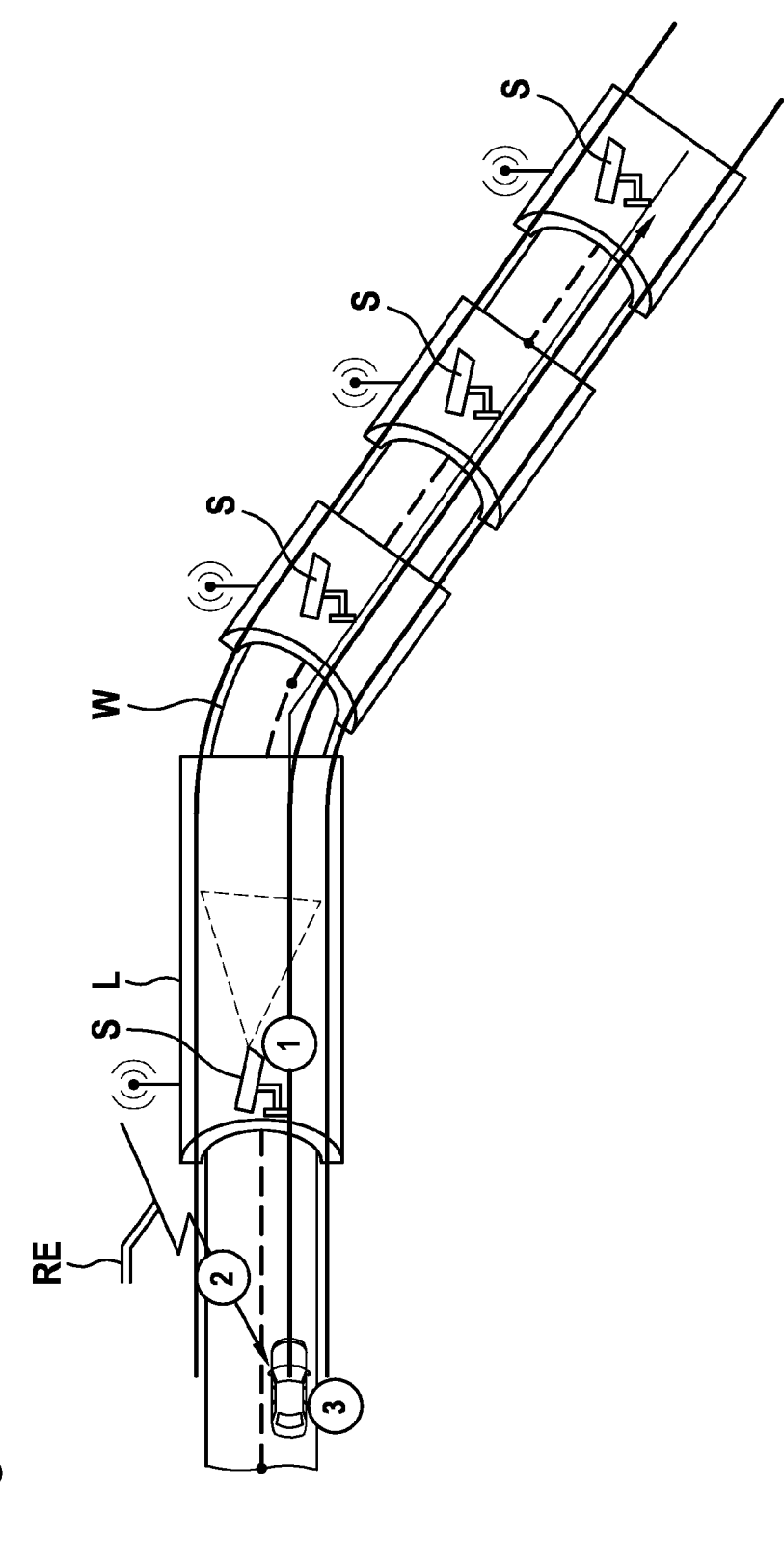
FIG. 2 schematically shows a schematic diagram of establishing a travelling corridor according to the present disclosure.

According to embodiments of the present disclosure, in order to ensure that stable and reliable lane information and lane environment information are provided for vehicles at a specific location such as a tunnel, as shown in FIG. 2, at least one sensor is provided in the tunnel and at its turning to detect the lane information and environment information of the lane. For example, such a sensor may be a camera S or a radar R (only the camera is schematically shown in the figure), which detects in the direction of the tunnel. In a dark environment such as the tunnel, there is usually a dedicated light source in the tunnel, and the camera may also be equipped with a dedicated light source to make up for insufficient light sources in the tunnel and provide enhanced light brightness for capturing. Therefore, road conditions, such as lane lines, in the tunnel can be clearly seen, and accurate lane information (denoted as Sig_Lane hereinafter) can be obtained. Herein, the lane information includes, but is not limited to, road edges, lane line markings, etc. In addition, laser radars (not shown in the figure) are provided in the tunnel and its turning, so that lane environment conditions, such as a wall of the tunnel, can be detected without any difficulty, and wall location information (denoted as Sig_Wall hereinafter) can be formed. Certainly, it is easily understood that with suitable light and capturing angles, the wall location information Sig_Wall of the tunnel may also be directly obtained from imaging of the camera mounted in the tunnel. The camera S and the radar R may continuously broadcast the lane information Sig_Lane and the environment information Sig_Wall generated after processing, for use by an upcoming vehicle. Herein, the lane information Sig_Lane and the environment information Sig_Wall such as a wall are collectively referred to as a road conditions signal SIG. Herein, a wireless transmitter integrated with or discrete from the sensor S or R may be used to send out the road conditions signal SIG. The wireless transmitter herein may be implemented using a known short-range communications protocol in the prior art, such as a cellular V2X protocol, or a 5G new radio V2X protocol, or using other Internet of things protocols.

Figure 3:
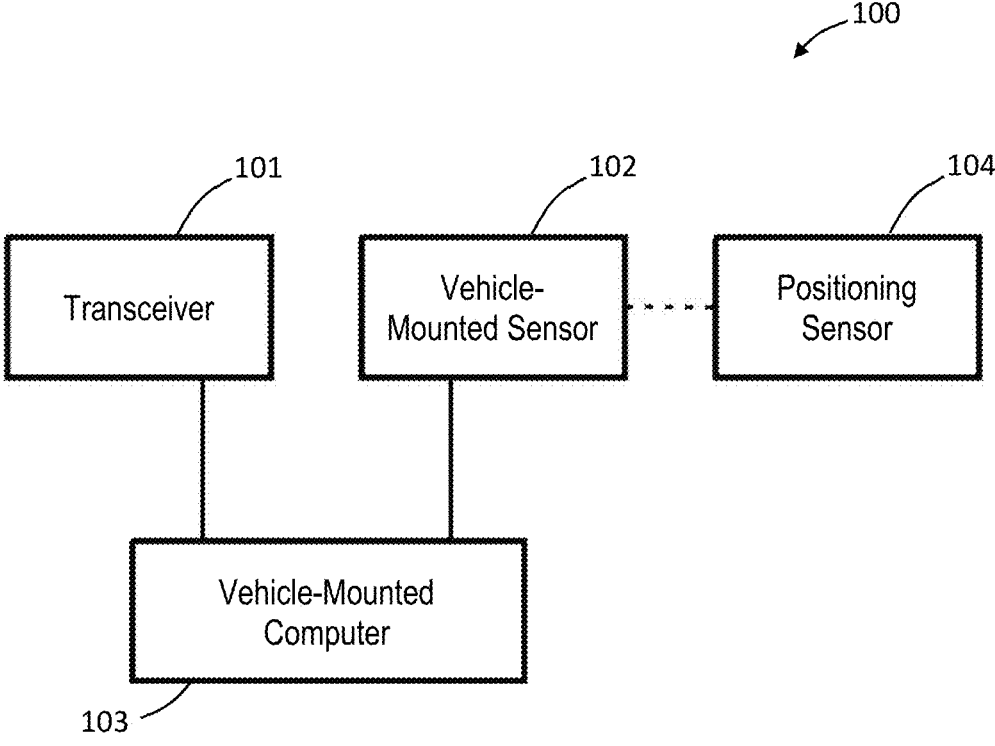
FIG. 3 shows a schematic diagram of a vehicle-mounted control system for implementing autonomous driving according to an example.

FIG. 3 shows a schematic diagram of a vehicle-mounted control system for implementing autonomous driving according to an embodiment of the present disclosure. As shown in the figure, the vehicle-mounted control system 100 includes a transceiver 101, a vehicle-mounted sensor 102, and a vehicle-mounted computer 103. The transceiver 101 is configured to implement communication between a vehicle and an external device, so as to receive traffic information from the outside or report its own information, and so on. Such an external device may be, for example, a roadside unit RSU. According to this embodiment, the transceiver 101 may also receive a road conditions signal SIG from a sensor, such as a camera S or a radar R, fixedly arranged in a specific location such as a tunnel. It is easily understood that lane information and environment information such as a wall collected by the sensor fixedly arranged in the tunnel are unchanged, and therefore the road conditions signal actually indicates static travelling information related to the lane. Certainly, the sensor in the tunnel provides information about other vehicles travelling in the tunnel, and sends the vehicle information as lane information to the transceiver. However, in the present disclosure, all the information collected by the sensor in the tunnel is considered as static travelling information herein.

The vehicle-mounted sensor 102 on the vehicle can collect, in real time, information about road conditions around the current vehicle during travelling. For example, such a vehicle-mounted sensor 102 may be a vision camera and/or a radar, etc., and is configured to capture travelling lane information and lane surrounding environment information. Such lane information is, for example, lane line distribution and the number of lanes on the current road; and the lane environment information is, for example, information about other vehicles on the current lane or an adjacent lane, median strips, and obstacles. Because the lane information and the lane environment information may change at any time during the travelling of the vehicle, the road conditions information captured by the vehicle-mounted sensor 102 is referred to as a dynamic travelling signal dyn_SIG herein. The vehicle-mounted computer 103 may be, for example, a vehicle-mounted MCU, which uses the dynamic road conditions information collected by the vehicle-mounted sensor 102 to establish a travelling corridor, so as to implement safe autonomous driving. Herein, the vehicle-mounted computer 103 may use an existing corridor generation algorithm in the prior art to establish the travelling corridor on the basis of the dynamic road conditions information collected by the vehicle-mounted sensor 102.

For the entire autonomous driving system, it is highly difficult to achieve comprehensive and accurate environment information detection by capturing data only relying on vehicle sensor information. High-precision maps and positioning, as a type of previously-proven information, can make up for defects in functions of autonomous driving sensors and provide a beyond-line-of-sight awareness capability. For example, information about longitudinal slope and transverse slope at a turning cannot be accurately output by the sensors themselves. When the line of sight is blocked or a curvature is small, beyond-line-of-sight information provided by a high-precision map is more required for planning and controlling the vehicle with a more solid basis. Therefore, as an example, the present disclosure further integrates a high-precision map for environment prediction. On the basis of a high-precision map provided by a vehicle-mounted positioning sensor (as shown by 104 in FIG. 3) such as a GPS system, different road environment information can be sent to the vehicle-mounted control system 100 for vehicle control. For example, when information about road construction ahead, information about traffic congestion ahead, information about a distance to a toll station, etc. are found, the anomaly information is sent to the vehicle control terminal 100 to amend a corresponding travellable corridor in a timely manner according to a special traffic situation ahead, and ensure that the travelling corridor is available with a specific safe stopping distance.

Apparently, when a vehicle enters a tunnel, for example, from a normal travelling road section, due to a sudden change of ambient light, it is difficult for a visual sensor to collect lane information in the tunnel, or even misjudgment occurs, and the travelling corridor cannot be established. Therefore, according to the present disclosure, when the vehicle enters the tunnel, a static road conditions signal provided by a sensor S or R in the tunnel is used to independently complete the establishment of the travelling corridor or assist the vehicle-mounted computer 103 to complete the establishment of the travelling corridor. According to an embodiment of the present disclosure, when the vehicle-mounted sensor detects that the vehicle is approaching the tunnel, the vehicle-mounted computer 103 may receive the static road conditions signal SIG from the tunnel sensor S or R by using the transceiver 101. According to another embodiment, the positioning sensor 104 provided in the vehicle may also be used to detect the existence of a specific location, such as the tunnel. When the positioning sensor 104 detects that the vehicle is about to enter the tunnel, the vehicle-mounted computer 103 receives the static road conditions signal sta_SIG from the tunnel sensor S or R by using the transceiver 101. According to the present disclosure, in order to distinguish whether the signal from the transceiver 101 is a road conditions signal SIG from the tunnel sensor or a signal from another external device such as an RSU, the road conditions signal SIG may be set to a predetermined format. For example, a fixed identifier ID is set in a packet header of the signal. In this way, the vehicle-mounted computer 103 can perform verification on the basis of the identifier ID when receiving the signal provided by the transceiver.

When the vehicle-mounted computer 103 confirms that the road conditions signal SIG from the tunnel sensor is received, a corridor generation algorithm may be used to establish the travelling corridor on the basis of the road conditions signal sta_SIG, or the detection signal dyn_SIG of the vehicle-mounted sensor. It should be noted here that when the road conditions signal sta_SIG from the tunnel sensor is used to establish the travelling corridor, the road conditions signal sta_SIG of the tunnel sensor is regarded as a signal dyn_SIG of the vehicle-mounted sensor, and therefore the corridor generation algorithm pre-stored in the vehicle-mounted computer can still be used for implementation, without making any changes to the algorithm.

Figure 4:
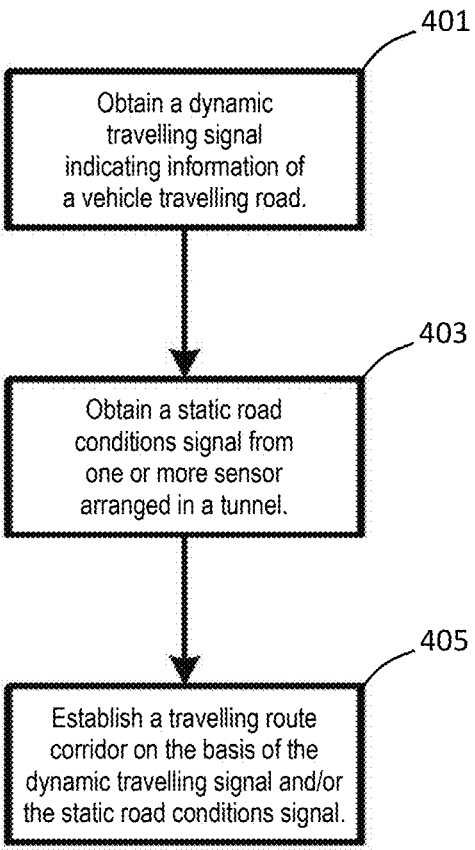
FIG. 4 shows a flowchart of a method for implementing autonomous driving according to an example.

FIG. 4 shows a schematic diagram of a method for establishing a travelling corridor by a vehicle-mounted control system according to an example of the present disclosure. In this example, a tunnel is still taken as an example of a specific location. At step 401, a vehicle-mounted control system 100 on a travelling vehicle obtains, from a vehicle-mounted sensor 102, a signal dyn_SIG indicating dynamic travelling information of a vehicle travelling road. The dynamic travelling information herein may be travelling-related information detected by various sensors mounted on the vehicle, such as information that is about changing lanes on a current travelling road and other vehicles travelling in the lanes and that is detected by a visual sensor, and information that is about surrounding vehicles in the lanes and a lane environment such as median strips on both sides and that is detected by a vehicle-mounted radar.

At step 403, when the vehicle travels into a predetermined range of the tunnel, the vehicle-mounted control system 100 may obtain, by using the transceiver 101, a static road conditions signal sta_SIG in the tunnel from one or more sensors fixedly arranged in the tunnel, including lane conditions and/or lane environment information of the current travelling road, such as information about a location of a tunnel wall relative to a lane. The predetermined range herein may be a predetermined distance before entering the tunnel and the entire length of the tunnel.

At step 405, the vehicle-mounted computer 103 establishes a travelling route corridor on the basis of at least one of the dynamic travelling signal dyn_SIG and the static road conditions signal sta_SIG. According to an example, although the vehicle has entered the predetermined distance before the tunnel, it is still possible to establish the travelling corridor on the basis of only the dynamic travelling signal dyn_SIG from the vehicle-mounted sensor. However, when the vehicle is about to enter the tunnel, the static road conditions signal sta_SIG from the tunnel sensor may be used instead of the dynamic travelling signal dyn_SIG, to establish the travelling corridor. According to another embodiment, because a radar has no requirement for ambient light, the vehicle may combine the static road conditions signal sta_SIG and the dynamic travelling signal dyn_SIG to establish the travelling corridor. For example, the travelling corridor may be established on the basis of the lane information contained in the static road conditions signal sta_SIG and the wall location information, detected by the radar, in the dynamic travelling signal dyn_SIG, so that the most reliable signal can be optimally used to establish the corridor.

Figure 5:
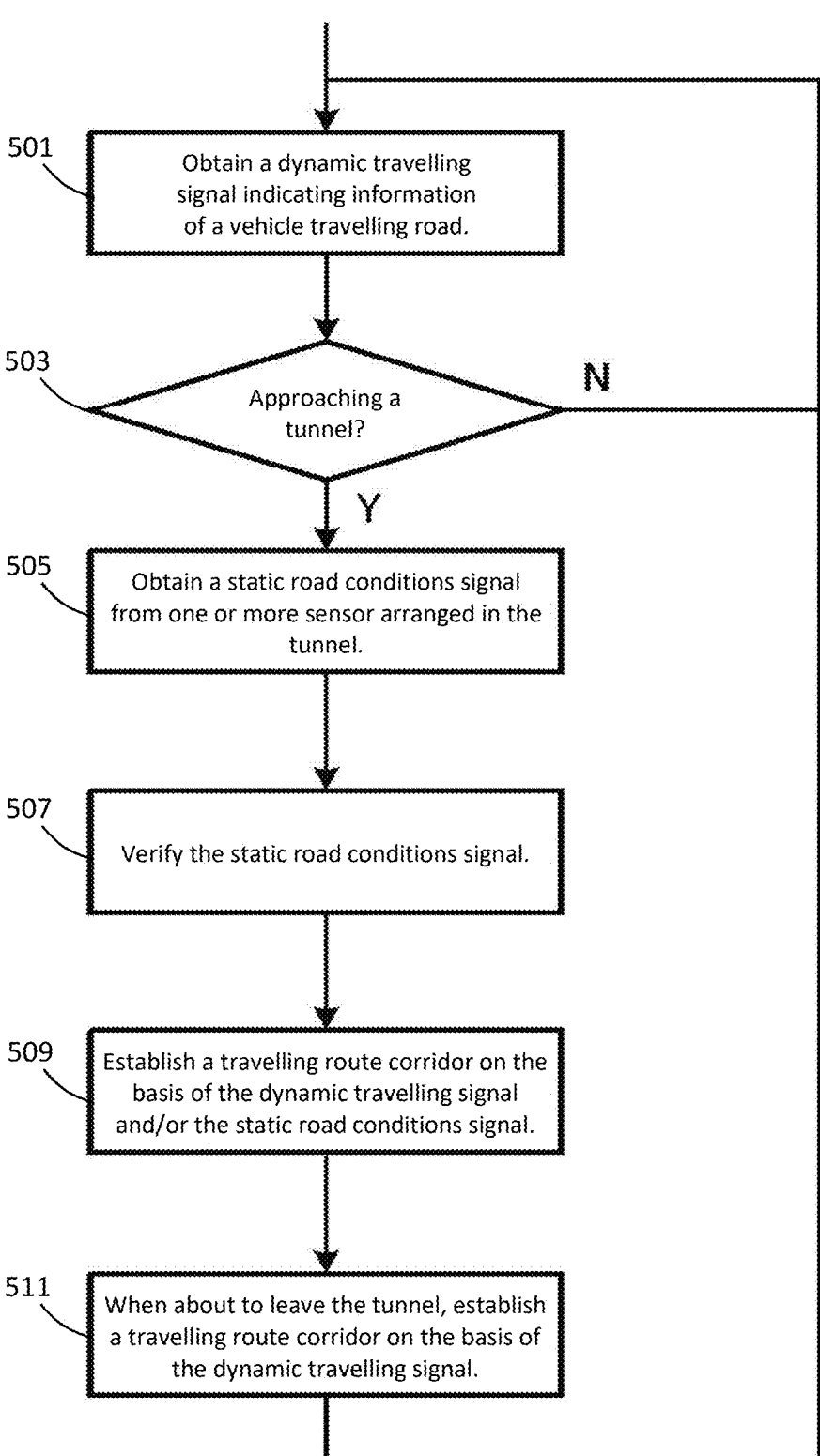
FIG. 5 shows a flowchart of a method for implementing autonomous driving according to another example.

FIG. 5 shows a schematic diagram of establishing a travelling corridor according to another embodiment of the present disclosure. In this example, a tunnel is still taken as an example for description. As shown in the figure, at step 501, a vehicle-mounted control system 100 on a travelling vehicle obtains a dynamic travelling signal dyn_SIG from a vehicle-mounted sensor 102, such as information that is about changing lanes on a current travelling road and other vehicles travelling in the lanes and that is detected by a visual sensor, and information that is about surrounding vehicles in the lanes and a lane environment such as median strips on both sides and that is detected by a vehicle-mounted radar. The vehicle-mounted computer 103 establishes a travelling corridor based on the dynamic travelling signal dyn_SIG. Herein, a technology known in the prior art may be used to establish the travelling corridor.

At step 503, the vehicle-mounted control system 100 detects whether the vehicle is approaching the tunnel. Herein, an image captured by the vehicle-mounted visual sensor 102 may be analyzed to determine whether there is a tunnel or a bridge opening, or a positioning signal of a GPS sensor 104 may be used to determine whether a tunnel or a bridge opening is about to appear ahead.

At step 505, when the vehicle travels into a predetermined range of the tunnel, the transceiver 101 is instructed to obtain a static road conditions signal sta_SIG in the tunnel from one or more sensors fixedly arranged in the tunnel, including lane conditions in the tunnel and/or information about a location of a tunnel wall relative to a lane, for example. The predetermined range herein may be a predetermined distance before entering the tunnel.

At step 507, the vehicle-mounted control system verifies the static road conditions signal sta_SIG received by using the transceiver 101, including signal quality detection. For example, if a bit error rate is too high, the current signal is discarded, and a subsequent signal continues to be received. When the signal quality detection succeeds, a source of the signal is further to be confirmed. For example, on the basis of an identifier ID in a packet header of the signal, it is determined that the signal comes from a tunnel sensor instead of a roadside unit, and can be used to establish a travelling corridor.

At step 509, a travelling route corridor is established on the basis of at least one of the dynamic travelling signal dyn_SIG and the static road conditions signal sta_SIG. According to an example, before the vehicle enters the tunnel, the dynamic travelling signal dyn_SIG of the vehicle-mounted sensor is used to establish the travelling corridor. However, when the vehicle is about to enter the tunnel, the static road conditions signal sta_SIG from the tunnel sensor is used instead of the dynamic travelling signal dyn_SIG, to establish the travelling corridor. According to another embodiment, because a radar has no requirement for ambient light, the vehicle may combine the static road conditions signal sta_SIG and the dynamic travelling signal dyn_SIG to establish the travelling corridor. For example, the travelling corridor may be established on the basis of the lane information contained in the static road conditions signal sta_SIG and the wall location information, detected by the radar, in the dynamic travelling signal dyn_SIG.

At step 511, when the vehicle is about to leave the tunnel, the dynamic signal dyn_SIG obtained by the vehicle-mounted sensor may be used again to establish the travelling corridor. For example, such switching may be initiated when the static signal sta_SIG from the tunnel sensor can no longer be received; or such switching may be initiated on the basis of the positioning signal from the GPS system 104.

The vehicle-mounted control system and the method of the present disclosure have been described above in conjunction with specific embodiments, but the present disclosure is not limited to the foregoing embodiments. For example, the method of the present disclosure may be implemented by a processor in a vehicle-mounted computer executing a program or instructions stored in a storage medium. A machine-readable medium provided in another embodiment of the present disclosure stores machine-readable instructions, where the machine-readable instructions, when executed by a vehicle-mounted computer, cause the vehicle-mounted computer to perform any of the foregoing methods. It should be noted that the execution order of the steps in the embodiments of the present disclosure is not fixed, and can be adjusted as required.

The present disclosure is illustrated and described in detail above by means of drawings and preferred embodiments; however, the present disclosure is not limited to these disclosed embodiments. Based on the plurality of embodiments described above, those skilled in the art would know that code checking means in different embodiments above may be combined to obtain more embodiments of the present disclosure, and these embodiments also fall within the scope of protection of the present disclosure.

The invention claimed is:

1. A method for implementing autonomous driving, the method comprising:
   obtaining, with a receiver of a vehicle control system of a vehicle, a first signal from at least one first sensor that is fixedly arranged at a specific location along a road while the vehicle is within a predetermined range of the specific location, wherein the first signal indicates static travelling information related to a lane of the road;
   obtaining, with a vehicle-mounted sensor of the vehicle control system, a second signal indicating dynamic travelling information related to the road;
   establishing a travelling route corridor with a vehicle-mounted computer of the vehicle control system, the travelling route corridor being an area of the road through which the vehicle can travel while avoiding obstacles, which is established based on the second signal while the vehicle is outside of the predetermined range of the specific location, the first signal replacing the second signal to establish the travelling route corridor while the vehicle is within the predetermined range of the specific location; and
   operating, with the vehicle control system, the vehicle to drive autonomously based on the established travelling route corridor.

2. The method of claim 1, wherein, within the predetermined range of the specific location, the first signal is continuously received until the first signal can no longer be received.

3. The method of claim 1, wherein:
   the first sensor comprises a first image sensor configured to capture lane information of a current lane as the first signal; and the vehicle-mounted sensor comprises a second image sensor and a radar device, and the second signal comprises (i) a third signal indicating information about the current lane of the vehicle and that is captured by the second image sensor, and (ii) a fourth signal indicating information about a surrounding environment of the current lane and that is obtained by the radar device,
   wherein the method further comprises: when the vehicle enters the predetermined range of the specific location, using the first signal to take over the third signal, and establishing the route corridor based on the first signal and the fourth signal.

4. The method of claim 1, wherein:
   the specific location is a tunnel or bridge opening; and
   the predetermined range is a predetermined distance before entering and after leaving the tunnel or bridge opening.

5. A vehicle-mounted control system for a vehicle, the vehicle-mounted control system comprising:
   a receiver configured to obtain a first signal from at least one first sensor fixedly arranged at a specific location along a road while the vehicle is within a predetermined range of the specific location, the first signal indicating static travelling information related to a current lane of the road;
   at least one vehicle-mounted sensor configured to detect dynamic travelling information of a vehicle and output a second signal indicating dynamic travelling information; and
   a vehicle-mounted computer that establishes a travelling route corridor, the traveling route corridor being an area of the road through which the vehicle can travel while avoiding obstacles, which is established based on the second signal while the vehicle is outside of the predetermined range of the specific location, the first signal replacing the second signal to establish the travelling route corridor while the vehicle is within the predetermined range of the specific location,
   wherein the vehicle control system operates the vehicle to drive autonomously based on the established travelling route corridor.

6. The vehicle-mounted control system of claim 5, further comprising:
   a positioning sensor configured to, when detecting that the vehicle enters a predetermined range of the specific location, trigger the receiver to receive the first signal.

7. The vehicle-mounted control system of claim 5, wherein, within the predetermined range of the specific location, the receiver is configured to continuously receive the first signal until the first signal can no longer be received.

8. The vehicle-mounted control system of claim 5, wherein:
   the first sensor comprises a first image sensor configured to capture lane information of a current lane as the first signal; and
   the vehicle-mounted sensor comprises a second image sensor and a radar device, and the second signal comprises (i) a third signal indicating information about the current lane of the vehicle and that is captured by the second image sensor, and (ii) a fourth signal indicating information about a surrounding environment of the current lane and that is obtained by the radar device;
   wherein the vehicle-mounted computer is configured to:
      when the vehicle enters the predetermined range of the specific location, use the first signal to take over the third signal; and establish the route corridor based on the first signal and the fourth signal.

9. The vehicle-mounted control system of claim 5, wherein:

the specific location is a tunnel or bridge opening; and the predetermined range is a predetermined distance before entering and after leaving the tunnel or bridge opening.

10. The vehicle-mounted control system of claim 6, wherein the positioning sensor is a vehicle-mounted GPS or a vehicle-mounted radar.

11. A vehicle-mounted computer, comprising:

a processor; and a memory storing instructions that, when executed by the processor, cause the processor to perform the method of claim 1.

12. A machine-readable storage medium having instructions stored thereon, wherein the instructions, when executed by a vehicle-mounted computer, cause the vehicle-mounted computer to perform the method of claim 1.

\* \* \* \* \*